United States Patent [19]

Isley

[11] 4,292,228
[45] Sep. 29, 1981

[54] PHYSICAL PROPERTY IMPROVEMENT IN NITRILE RESINS BY USE OF CERTAIN PROCESSING AIDS AND FILLERS

[75] Inventor: Ralph E. Isley, Northfield, Ohio

[73] Assignee: The Standard Oil Company, Cleveland, Ohio

[21] Appl. No.: 70,591

[22] Filed: Aug. 29, 1979

[51] Int. Cl.³ .............................................. C08K 5/15
[52] U.S. Cl. .............................. 260/30.4 A; 260/30.2; 260/30.4 N; 260/31.8 DR; 260/37 N; 525/5; 525/285; 525/310
[58] Field of Search ......... 260/30.2, 30.4 A, 31.8 DR, 260/37 N; 525/310, 285, 5

[56] References Cited

U.S. PATENT DOCUMENTS

| | | | |
|---|---|---|---|
| 3,426,102 | 2/1969 | Solak et al. | 525/310 |
| 3,586,737 | 6/1971 | Duke et al. | 525/310 |
| 3,725,332 | 4/1973 | Carrock | 260/31.8 DR |
| 4,000,106 | 12/1976 | Isley | 260/31.8 DR |
| 4,151,151 | 4/1979 | Isley | 525/310 |

Primary Examiner—William F. Hamrock
Attorney, Agent, or Firm—William D. Mooney; Herbert D. Knudsen; Larry W. Evans

[57] ABSTRACT

Physical properties particularly including tensile modulus and heat-distortion temperature of high nitrile copolymer resins are improved by including therein a processing aid, such as tetra chloro phthalic anhydride, and a filler material, such as clay.

12 Claims, No Drawings

PHYSICAL PROPERTY IMPROVEMENT IN NITRILE RESINS BY USE OF CERTAIN PROCESSING AIDS AND FILLERS

This invention relates to a mixture of a nitrile barrier resin and a combination of certain processing aids and fillers and to a process for preparing such mixtures to produce polymer compositions having improved physical properties.

Thermoplastic nitrile barrier resins, including those described in U.S. Pat. Nos. 3,426,102 and 3,586,737, are known to have many very desirable properties including gas barrier properties, impact resistance, chemical resistance, and the like. The present invention is an improvement over my co-pending U.S. patent application Ser. No. 870,053 filed Jan. 16, 1978, now U.S. Pat. No. 4,151,151, and other prior art in that it represents a composition comprising a blend of a prior art nitrile barrier resin with certain processing aids and fillers, which blend possesses unexpectedly higher heat-distortion temperature, high modulus, and in some cases improved fire retardancy.

The nitrile barrier resins useful in the present invention include those prepared by the polymerization of (A) from 60 to 90% by weight of at least one nitrile having the structure $$CH_2=C-CN$$
$$|$$
$$R$$

wherein R is hydrogen, a lower alkyl group having from 1 to 4 carbon atoms, or a halogen, (B) from 10 to 40% by weight based on the combined weight of (A) and (B) of at least one member selected from the group consisting of (1) an ester having the structure $$CH_2=C-COOR_2$$
$$|$$
$$R_1.$$

wherein $R_1$ is hydrogen, an alkyl group having from 1 to 4 carbon atoms, or a halogen, and $R_2$ is an alkyl group having from 1 to 6 carbon atoms, (2) an alpha-olefin having the structure $$\begin{array}{c} R' \\ | \\ CH_2=C \\ | \\ R'' \end{array}$$

wherein R' and R'' are alkyl groups having from 1 to 7 carbon atoms, (3) a vinyl ether selected from the group consisting of methyl vinyl ether, ethyl vinyl ether, the propyl vinyl ethers, and the butyl vinyl ethers, (4) vinyl acetate, (5) styrene, and (6) indene, in the presence of from 0 to 40 parts by weight of (C) a rubbery polymer of a conjugated diene monomer selected from the group consisting of butadiene and isoprene and optionally a comonomer selected from the group consisting of styrene, a nitrile monomer having the structure $$CH_2=C-CN$$
$$|$$
$$R$$

wherein R has the foregoing designation, and an ester having the structure $$CH_2=C-COOR_2$$
$$|$$
$$R_1$$

wherein $R_1$ and $R_2$ have the foregoing designations, said rubbery polymer containing from 50 to 100% by weight of polymerized conjugated diene and from 0 to 50% by weight of comonomer.

The nitrile barrier resins embodied in this invention can be prepared by any of the known general techniques of polymerization including the bulk polymerization, solution polymerization and emulsion or suspension polymerization techniques by batch, continuous or intermittent addition of monomers and other components. The preferred method is polymerization in aqueous emulsion or suspension.

The processing aids useful in this invention include at least one acid anhydride, dibasic acid, polybasic acid, amino acid, halogenated acid, halogenated acid anhydride, and more specific examples are glutaric anhydride; 1,2,4 benzene tricarboxylic anhydride; 1,2,4,5 benzene tetra carboxylic anhydride; maleic anhydride; mellitic anhydride, phthalic anhydride; succinic anhydride; tetra chloro phthalic anhydride; tetra bromo phthalic anhydride; dichloro maleic anhydride; adipic acid; azelaic acid; glutaric acid; maleic acid; malonic acid; pimelic acid; sebacic acid; suberic acid; succinic acid; dichloro phthalic acid; dichloro anthranilic acid; benzene tetra carboxylic acid; trimellitic acid; mellitic acid; citric acid; tartaric acid; anthranilic acid; glutamic acid; beta-hydroxy glutamic acid; lysine; tryptophane; phenylalanine; and others.

The fillers useful in this invention include at least one alumino silicate, alumina trihydrate, metal oxide, metal hydroxide, metal carbonate, metal sulfate, and others. More specific examples are calcium carbonate, magnesium carbonate, basic lead carbonate, zinc carbonate, aluminum hydroxide (hydrated), calcium hydroxide, lead hydroxide, zinc chromate, aluminum oxide, calcium oxide, chromium oxide, iron oxide, magnesium oxide, lead oxides, titanium dioxide, zinc oxide, aluminum silicate (hydrated), magnesium aluminum silicate, potassium aluminum silicate, sodium aluminum silicate, amorphous silica, calcium meta silicate, calcium silicate, diatomaceous silica, magnesium silicate, basic lead sulfate, barium sulfate, calcium sulfate, cadmium sulfide, mercuric sulfide, lead sulfide, and glass spheres. In addition, fibers including asbestos, glass, mineral and wollastonite may be used.

In the following examples which will further illustrate this invention, the amounts of the various ingredients are expressed in parts by weight unless otherwise indicated.

EXAMPLE 1

A. A rubber latex was prepared by polymerizing with continuous agitation at 45° C. in the substantial absence of molecular oxygen a mixture of the following ingredients:

| Ingredient | Parts |
| --- | --- |
| acrylonitrile | 30 |
| butadiene-1,3 | 70 |
| emulsifier (Gafac RE-610)* | 2.4 |

-continued

| Ingredient | Parts |
| --- | --- |
| azobisisobutyronitrile | 0.3 |
| t-dodecyl mercaptan | 0.5 |
| water | 200 |

*A mixture of R—O—(CH$_2$CH$_2$O—)$_n$PO$_3$M$_2$ and [R—O—(CH$_2$CH$_2$O—)$_n$]$_2$PO$_2$M wherein n is a number from 1 to 40. R is an alkyl or aralkyl group and preferably a nonyl phenyl group, and M is hydrogen, ammonia or an alkali metal, which composition is sold by GAF Corporation.

Before reaction was started, the pH of the mixture was adjusted to about 8 with KOH. The polymerization was carried out for 22½ hours to a conversion of about 92% and a total solids of about 33.1%.

B. An impact-resistant gas-barrier resin was prepared by polymerization of a mixture of the following ingredients:

| Ingredient | Parts |
| --- | --- |
| acrylonitrile | 75 |
| methyl acrylate | 25 |
| rubber solids in the form of latex A (above) | 9 |
| potassium persulfate | 0.06 |
| emulsifier (Gafac RE-610) | 3 |
| modifier (n-dodecyl mercaptan) | 1 |
| water | 200 |

The pH was adjusted to about 7 with NaOH. The polymerization was carried out in the substantial absence of oxygen at 60° C. for 5 hours to produce a 91% conversion. The resulting latex was coagulated and the recovered resin was dried. The resin was compression molded in a ⅛-inch thick sheet mold at 320° F. and cooled. Samples cut from this sheet were tested and found to have an ASTM tensile modulus of 460,000 psi and an ASTM heat-distortion temperature at a 264 psi stress of 68° C.

EXAMPLE 2

The following formulation was employed:

| | Parts |
| --- | --- |
| resin of Example 1 | 100 |
| tetra chloro phthalic anhydride | 10 |
| hydrated clay | 56 |

This formulation was charged into an internal mixer heated to 235° C. and run for 5 minutes at a rotor speed of 35 rpm. The product was compression molded in a ⅛-inch thick sheet mold at 320° F. and cooled. Samples cut from the sheet produced were tested and found to have a tensile modulus of 1,000,000 psi and a heat-distortion temperature at a 264 psi stress of 73° C.

EXAMPLE 3

A formulation consisting of the following was weighed out:

| | Parts |
| --- | --- |
| resin of Example 1 | 100 |
| tetra chloro phthalic anhydride | 20 |
| magnesium oxide | 111 |

This formulation was charged into an internal mixer heated to 235° C. and run for 5 minutes at a rotor speed of 35 rpm. The product was then compression molded by charging into a ⅛-inch sheet mold held at 320° F. and cooled. Samples cut from the sheet were tested and found to have a tensile modulus of 1,850,000 psi and a heat-distortion temperature run at a 264 psi stress of 84° C.

EXAMPLE 4

The procedure of Example 3 was used employing the following formulation:

| | Parts |
| --- | --- |
| resin of Example 1 | 100 |
| tetra chloro phthalic anhydride | 10 |
| barium sulfate | 153 |

The resulting blend was found to have a tensile modulus of 780,000 psi and a heat-distortion temperature of 73° C.

EXAMPLE 5

The procedure of Example 3 was used employing the following formulation:

| | Parts |
| --- | --- |
| resin of Example 1 | 100 |
| tetra chloro phthalic anhydride | 10 |
| calcium meta silicate | 101 |

The resin blend was found to have a tensile modulus of 1,270,000 psi and a heat-distortion temperature of 75° C.

EXAMPLE 6

The procedure of Example 3 was used employing the following formulation:

| | Parts |
| --- | --- |
| resin of Example 1 | 100 |
| tetra chloro phthalic anhydride | 17.3 |
| hydrous clay (alumino silicate) | 266 |

The blend was found to have a tensile modulus of 1,720,000 psi and a heat-distortion temperature of 80° C.

EXAMPLE 7

The procedure of Example 1 was used employing the following formulation:

| | Parts |
| --- | --- |
| resin of Example 1 | 100 |
| tetra chloro phthalic anhydride | 32.2 |
| hydrous clay | 254 |

The blend was found to have a tensile modulus of 1,690,000 psi and a heat-distortion temperature of 80° C.

EXAMPLE 8

The procedure of Example 3 was used employing the following formulation:

| | Parts |
| --- | --- |
| resin of Example 1 | 100 |
| tetra chloro phthalic anhydride | 26.1 |

-continued

|  | Parts |
|---|---|
| hydrous clay | 336 |

The resulting blend was found to have a tensile modulus of 3,160,000 psi and a heat-distortion temperature of 88° C.

EXAMPLE 9

The procedure of Example 3 was used employing the following formulation:

|  | Parts |
|---|---|
| resin of Example 1 | 100 |
| phthalic anhydride | 10 |
| magnesium oxide | 56 |

The resulting blend was found to have a tensile modulus of 1,700,000 psi and a heat-distortion temperature of 80° C.

EXAMPLE 10

The procedure of Example 3 was used employing the following formulation:

|  | Parts |
|---|---|
| resin of Example 1 | 100 |
| 1,2,4 benzene tricarboxylic anhydride | 17.4 |
| magnesium oxide | 57 |

The resulting blend was found to have a tensile modulus of 1,220,000 psi and a heat-distortion temperature of 82° C.

EXAMPLE 11

The procedure of Example 3 was used employing the following formulation:

|  | Parts |
|---|---|
| resin of Example 1 | 100 |
| 1,2,4,5 benzene tetra carboxylic anhydride | 17.4 |
| magnesium oxide | 57 |

The resulting blend was found to have a tensile modulus of 1,090,000 psi and a heat-distortion temperature of 80° C.

EXAMPLE 12

The procedure of Example 3 was used employing the following formulation:

|  | Parts |
|---|---|
| resin of Example 1 | 100 |
| tetra chloro phthalic anhydride | 8.6 |
| magnesium oxide | 56 |

The resulting blend was found to have a tensile modulus of 1,000,000 psi and a heat-distortion temperature of 79° C.

EXAMPLE 13

The procedure of Example 3 was used employing the following formulation:

|  | Parts |
|---|---|
| resin of Example 1 | 100 |
| tetra bromo phthalic anhydride | 43.6 |
| hydrous clay | 226 |

The resulting blend was found to have a tensile modulus of 2,580,000 psi and a heat-distortion temperature of 83° C.

EXAMPLE 14

The procedure of Example 3 was used employing the following formulation:

|  | Parts |
|---|---|
| resin of Example 1 | 100 |
| tetra chloro phthalic anhydride | 4.3 |
| hydrated alumina | 10.5 |

The final blend was found to have a tensile modulus of 497,000 psi and a heat-distortion temperature of 69° C.

EXAMPLE 15

The procedure of Example 3 was used employing the following formulation:

|  | Parts |
|---|---|
| resin of Example 1 | 100 |
| tetra chloro phthalic anhydride | 4.3 |
| calcium carbonate | 11.7 |

The resulting blend was found to have a tensile modulus of 5,160,000 psi and a heat-distortion temperature of 69° C.

I claim:
1. The composition comprising a blend of a resin, from 2 to 50 parts by weight per hundred parts by weight of resin of an polycarboxylic acid anhydride processing aid, and from 5 to 400 parts by weight per 100 parts by weight of resin of a filler selected from the group consisting of calcium carbonate, magnesium carbonate, basic lead carbonate, zinc carbonate, aluminum hydroxide (hydrated), calcium hydroxide, lead hydroxide, zinc chromate, aluminum oxide, calcium oxide, chromium oxide, iron oxide, magnesium oxide, lead oxides, titanium dioxide, zinc oxide, aluminum silicate (hydrated), magnesium aluminum silicate, potassium aluminum silicate, sodium aluminum silicate, amorphous silica, calcium meta silicate, calcium silicate, diatomaceous silica, magnesium silicate, basic lead sulfate, barium sulfate, calcium sulfate, cadmium sulfide, mercuric sulfide and lead sulfide said resin being a polymer which results from the polymerization of
(A) from 60 to 90% by weight of at least one nitrile having the structure

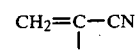

wherein R is hydrogen, a lower alkyl group having from 1 to 4 carbon atoms, or a halogen, (B) from 10 to 40% by weight based on the combined weight of (A) and (B) of an ester having the structure $$CH_2=\underset{R_1}{C}-COOR_2$$

wherein $R_1$ is hydrogen, an alkyl group having from 1 to 4 carbon atoms, or a halogen, and $R_2$ is an alkyl group having from 1 to 6 carbon atoms, in the presence of from 1 to 40 parts by weight of (C) a rubbery polymer of a conjugated diene monomer selected from the group consisting of butadiene and isoprene and optionally a comonomer selected from the group consisting of styrene, a nitrile monomer having the structure $$CH_2=\underset{R}{C}-CN$$

wherein R has the foregoing designation, and an ester having the structure $$CH_2=\underset{R_1}{C}-COOR_2$$

wherein $R_1$ and $R_2$ have the foregoing designations, said rubbery polymer containing from 50 to 100% by weight of polymerized conjugated diene and from 0 to 50% by weight of comonomer.

2. The composition of claim 1 wherein the processing aid is at least one member selected from the group consisting of glutaric anhydride; 1,2,4 benzene tricarboxylic anhydride; 1,2,4,5 benzene tetra carboxylic anhydride; maleic anhydride; mellitic anhydride; phthalic anhydride; succinic anhydride; tetra chloro phthalic anhydride; tetra bromo phthalic anhydride; and dichloro maleic anhydride.

3. The composition of claim 1 wherein the processing aid is tetra chloro phthalic anhydride and the filler is hydrated clay.

4. The composition of claim 1 wherein the processing aid is tetra chloro phthalic anhydride and the filler is magnesium oxide.

5. The composition of claim 1 wherein the processing aid is tetra chloro phthalic anhydride and the filler is barium sulfate.

6. The composition of claim 1 wherein the processing aid is tetra chloro phthalic anhydride and the filler is calcium meta silicate.

7. The composition of claim 1 wherein the processing aid is phthalic anhydride and the filler is magnesium oxide.

8. The composition of claim 1 wherein the processing aid is 1,2,4 benzene tricarboxylic anhydride and the filler is magnesium oxide.

9. The composition of claim 1 wherein the processing aid is tetra bromo phthalic anhydride and the filler is hydrous clay.

10. The composition of claim 1 wherein 10.5 to 336 parts by weight of the filler is present in the blend.

11. The composition of claim 10 wherein more than 56 parts by weight of the filler is present in the blend.

12. The composition of claim 1 wherein (B) is methyl acrylate.

* * * * *